April 22, 1969 W. A. SIPES 3,439,531
METHOD FOR SIMULATING ENVIRONMENTAL CONDITIONS
Filed Feb. 11, 1966
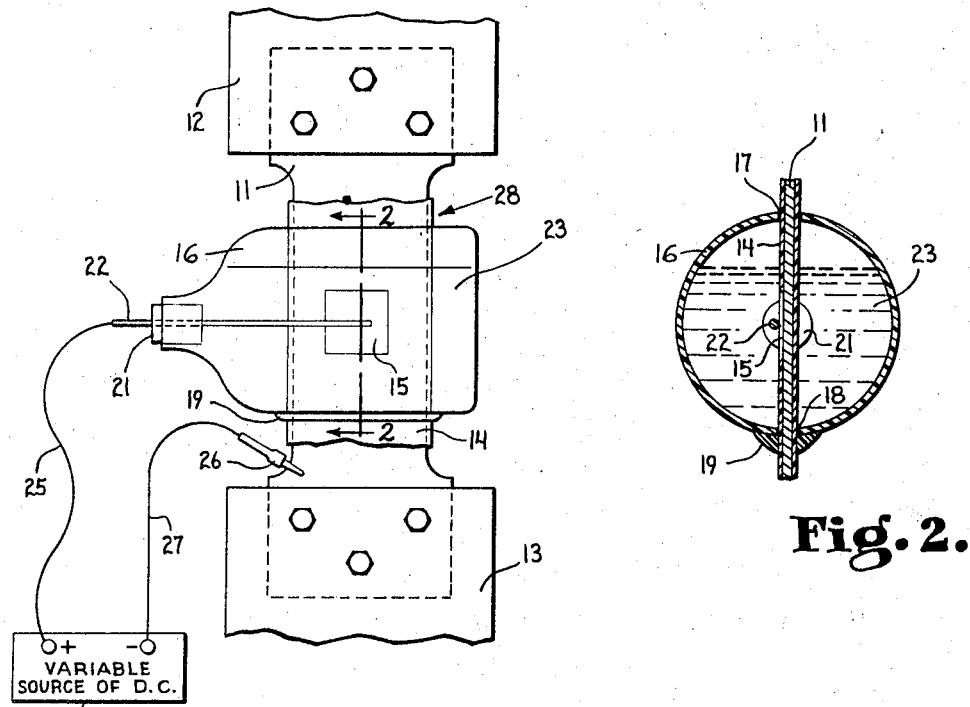
Fig. 1.
Fig. 2.
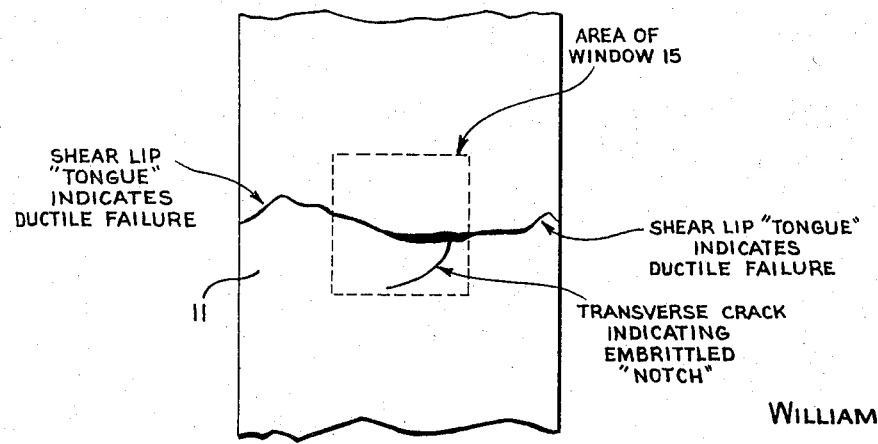
Fig. 3.
INVENTOR.
WILLIAM A. SIPES
BY
ATT'YS.

United States Patent Office 3,439,531
Patented Apr. 22, 1969

3,439,531
METHOD FOR SIMULATING ENVIRONMENTAL CONDITIONS
William A. Sipes, Philadelphia, Pa., assignor to the United States of America as represented by the Secretary of the Navy
Filed Feb. 11, 1966, Ser. No. 527,385
Int. Cl. G01n *17/00*
U.S. Cl. 73—86                                5 Claims

ABSTRACT OF THE DISCLOSURE

A method for simulating an environmental condition which produces hydrogen embrittlement in a metal part comprising masking a metal part with a protective coating while leaving uncoated a small area, and applying a current to an electrolyte while said metal part is immersed in the electrolyte and while a stressing force is applied to the metal part.

---

The invention described herein may be manufactured and used by or for the Government of the United States of America for governmental purposes without the payment of any royalties thereon or therefor.

The present invention relates to a method for simulating environmental conditions, and more particularly to a method for subjecting metals and alloys to corrosion and hydrogen embrittlement while in a stressed condition.

Various mechanical and chemical tests are applied to metallic materials to evaluate the ability of of the materials to resist deteriorations due to environment. One widely used method consists of alternately immersing a test specimen in a chemical bath and then removing and applying a mechanical test to the specimen. It is more desirable, however, to provide a laboratory test that will provide a close enalogy to the actual "life" conditions which will confront the material.

The present invention provides a combination mechanical and chemical test for evaluating materials with reference to stress, stress-corrosion, and hydrogen embrittlement. A test sample is passed through a container holding an electrolyte with the ends of the test sample being attached to a tension testing machine. The surface of the test sample within the container is coated with a waterproof masking compound, however, a small "window" area is provided in the masking compound thereby leaving a small portion of the test sample unprotected. An electrode is provided in the container and is inserted in the electrolyte. A variable source of direct current is provided, and one terminal from the source is connected to the electrode and the other terminal is connected to the test specimen. By varying the elecrolyte and the amount of current while applying various loads to the test sample, various conditions can be simulated.

It is therefore a general object of the present invention to provide an improved method for simulating adverse environmental conditions.

Another object of the present invention is to provide an improved method for simultaneously subjecting metals to mechanical and chemical tests.

Other objects and advantages of the present invention will be readily appreciated as the same becomes better understood by reference to the following detailed description when considered in connection with the accompanying drawing in which:

FIG. 1 is a front view illustrating the method of operation of the present invention;

FIG. 2 is a sectional view taken on line 2—2 of FIG. 1; and

FIG. 3 is a plan view of a portion of a test specimen that has failed.

Referring now to the drawing, there is shown a test sample 11 of metallic material that is attached to jaws 12 and 13 of a tension testing machine. The center portion of test sample 11 is coated with a masking compound 14 which is waterproof and preferably nonconductive. By way of example, a butyrate-acetate base compound might be used as the masking compound and can be applied in liquid form and then allowed to solidify. A small area of masking compound 14 is removed from the center portion to provide a window 15 that is free of any masking compound.

A container 16, having a top slot 17 and a bottom slot 18, is positioned around test sample 11 with the ends of test sample 11 extending outwardly through slots 17 and 18. A suitable caulking compound 19 is applied around bottom slot 18 and the portion of test sample 11 adjacent thereto so that slot 18 is sealed and so that container 16 can hold a liquid material. Container 16 is made of a nonconductive material, which by way of example might be of plastic, and container 16 might be in the shape of a bottle and have a stopper 21 for closing an open end. A platinum electrode 22 is passed through stopper 21 with one end of electrode 22 being positioned outside of container 16 and the other end being positioned within container 16. The end of electrode 22 that terminates within container 16 is in juxtaposition to the center of window 15.

An electrolyte 23 is provided within container 16 and a sufficient quantity of electrolyte is provided so that window 15 is completely immersed in the electrolyte. By way of example, a suitable electrolyte useful for the purpose of producing hydrogen embrittlement fractures in a steel test sample might be either a solution of 0.1 N (normal) potassium cyanide and 0.1 N (normal) sodium hydroxide, or a solution of 0.1 N (normal) sodium cyanide and 0.1 N (normal) sodium hydroxide. A source 24 of direct current is provided and one terminal of source 24 is connected to electrode 22 by means of lead 25 and the other terminal of source 24 is connected to test sample 11 by clip 26 and lead 27. While the drawing indicates that the positive terminal of source 24 is connected to platium electrode 22 and that the negative terminal of source 24 is connected directly to test sample 11, it should be understood that the polarity might be readily reversed for different testing situations.

Example of operation

A specimen 11 of A1S1 4340 steel 3 inches wide, 9 inches long, and ⅛ inch thick was reduced to provide a gage section 28 that was 2¼ inches wide, 5 inches long and 0.090 inches thick. The gage section was coated with a butyrate-acetate base compound with a one square inch window 15 being provided on one side of specimen 11. The specimen had been heat treated to provide a nominal high strength level of 240,000 p.s.i.

Specimen 11 was inserted through slots 18 and 19 so that the ends of specimen 11 extended beyond container 16, and container 16 was then caulked around slot 19 so that container 16 would be fluidtight. A quantity of electrolyte 23 consisting of a solution of 0.1 N (normal potassium cyanide and 0.1 N (normal) sodium hydroxide was poured into container 16 and a sufficient quantity was provided to assure that window 15 would be completely covered during testing.

Stopper 21 was then used to close container 16 and electrode 22 was inserted into container 16 through stopper 21. The ends of specimen 11 were then clamped by jaws 12 and 13 of a tension testing machine.

The end of electrode 22 extending outside of container 16 was connected to the positive terminal of direct current source 24 and the negative terminal of source 24 was connected directly to specimen 11. The flow of current into electrolyte 23 causes electrolytic cell action and, simultaneously with this cell action, specimen 11 was stressed at 150,000 p.s.i.

FIG. 3 of the drawing shows the nature of the failure due to hydrogen embrittlement which was due to the combination of stress and electrolytic cell action. Photo macrographs, electron fractographs, and electron diffraction photographs were made of specimen 11 after failure and these confirmed that failure of specimen 11 was enhanced by hydrogen embrittlement. Within the window area there appeared a transverse crack which indicated an embrittled "notch," while near each side of specimen 11 there appeared a shear lip tongue which indicated a ductile failure.

It can thus be seen that the present invention provides an improved method for simulating adverse environmental conditions on metals, particularly that of causing hydrogen embrittlement which leads to an accelerated failure of metal. Obviously many modifications and variations of the present invention are possible in the light of the above teachings. For example, by reversing the polarity of the terminals, that is, by making electrode 22 a cathode, stress-corrosion environments can be simulated. It is therefore to be understood, that within the scope of the appended claims, the invention may be practiced otherwise than as specifically described.

What is claimed is:

1. A method for simulating an environmental condition, comprising the steps of,
   coating a gage section of a metallic test specimen with a masking compound but leaving uncoated a small area thereof,
   then immersing said coated gage section in an electrolyte, and
   then simultaneously stressing said metallic test specimen and applying a direct current to said electrolyte whereby said uncoated small area undergoes hydrogen embrittlement.

2. A method for simulating an environmental condition as set forth in claim 1 wherein said masking compound is a butyrate-acetate base compound.

3. A method for simulating an environmental condition as set forth in claim 1 wherein said electrolyte is comprised of a solution of 0.1 N potassium cyanide and 0.1 N sodium hydroxide.

4. A method for simulating an environmental condition as set forth in claim 1 wherein said electrolyte is comprised of a solution of 0.1 N sodium hydroxide and 0.1 N sodium cyanide.

5. A method for simulating an environmental condition as set forth in claim 1 wherein a platinum electrode is inserted into said electrolyte and said direct current is passed through said platinum electrode.

References Cited

UNITED STATES PATENTS

| | | | |
|---|---|---|---|
| 2,735,754 | 2/1956 | Dravnieks | 73—86 |
| 2,991,439 | 7/1961 | Marsh et al. | 73—86 |
| 2,994,219 | 8/1961 | Schaschl | 73—86 |
| 3,060,728 | 10/1962 | Wolber | 73—86 |
| 3,257,841 | 6/1966 | Lawrence | 73—86 |

JAMES J. GILL, *Primary Examiner.*

C. IRVIN McCLELLAND, *Assistant Examiner.*